United States Patent [19]

Gambetti

[11] Patent Number: 5,163,543
[45] Date of Patent: Nov. 17, 1992

[54] APPARATUS FOR GROUPING TOGETHER ARTICLES SIDE-BY-SIDE TRANSVERSELY AND LONGITUDINALLY IN GROUPS OF VARIABLE QUANTITIES FOR CONTINUOUS FEEDING TO PACKAGING MACHINES

[75] Inventor: Mario Gambetti, Crevalcore, Italy

[73] Assignee: Baumer S.R.L., Castelfranco Emilia, Italy

[21] Appl. No.: 792,471

[22] Filed: Nov. 14, 1991

[30] Foreign Application Priority Data

Dec. 3, 1990 [IT] Italy ................................ 3761 A/90

[51] Int. Cl.⁵ ............................................ B65G 47/26
[52] U.S. Cl. .............................. 198/419.3; 198/473.1; 198/803.11; 198/803.13
[58] Field of Search .............. 198/419.3, 473.1, 484.1, 198/626.5, 803.11, 803.13; 53/543

[56] References Cited

U.S. PATENT DOCUMENTS

| | | | |
|---|---|---|---|
| 2,722,305 | 11/1955 | McCabe | 198/473.1 |
| 3,857,474 | 12/1974 | Hutson | 198/626.5 |
| 4,502,592 | 3/1985 | Ramcke | 198/626.5 |
| 4,637,509 | 1/1987 | Raudat et al. | 198/419.3 |
| 4,641,742 | 2/1987 | Igarashi et al. | 198/626.5 |
| 4,718,540 | 1/1988 | Greenwell | 198/803.11 |
| 4,893,707 | 1/1990 | Langen et al. | 198/803.11 |

FOREIGN PATENT DOCUMENTS 1292738 10/1972 United Kingdom .
1355572 6/1974 United Kingdom .

Primary Examiner—Joseph E. Valenza
Attorney, Agent, or Firm—Herbert Dubno

[57] ABSTRACT

An apparatus for grouping together articles in groups of variable quantities for feeding to packaging machines in a continuous movement has a pair of links to corresponding cursor-guide members in a mirror-image arrangement and is provided for positioning at least one of the cursor-guide members rotatably about a common axis drive shaft arrangement with the corresponding guide members rotatable about corresponding motorized shafts having mutually coaxial axes ending in counterthrusters and thrusters respectively of the continuous conveyor of objects to be packed by the packaging machine.

4 Claims, 5 Drawing Sheets

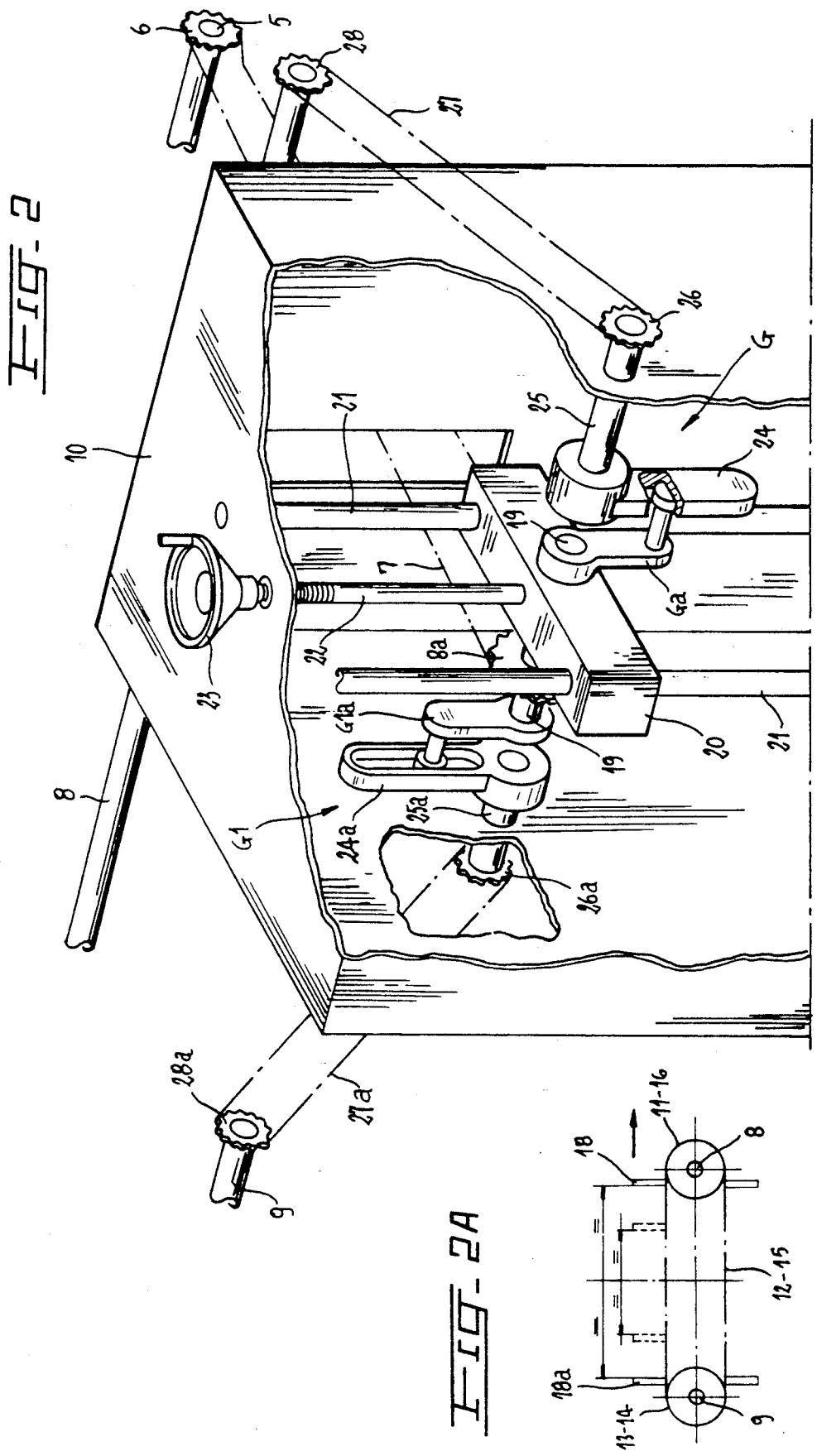

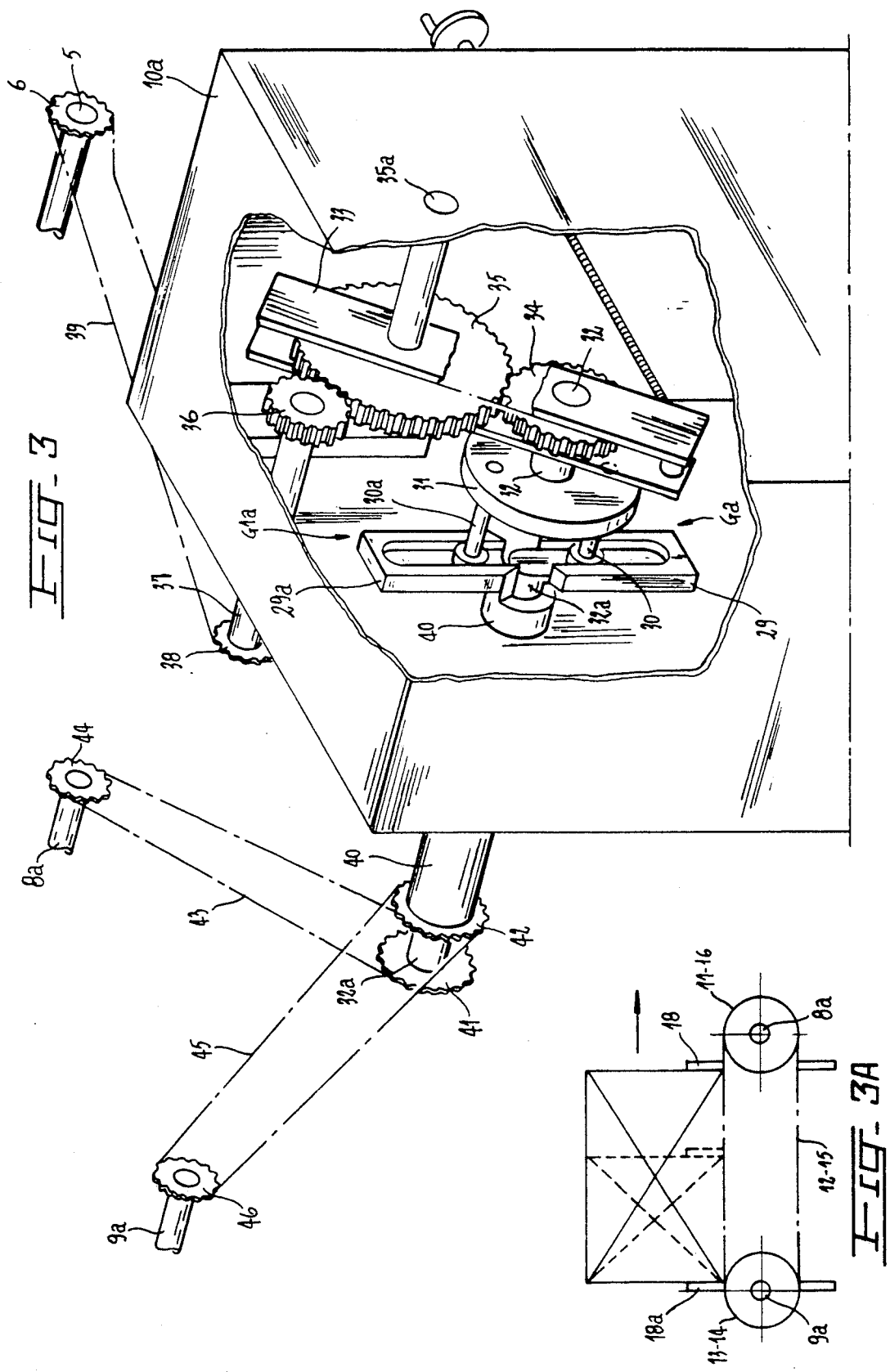

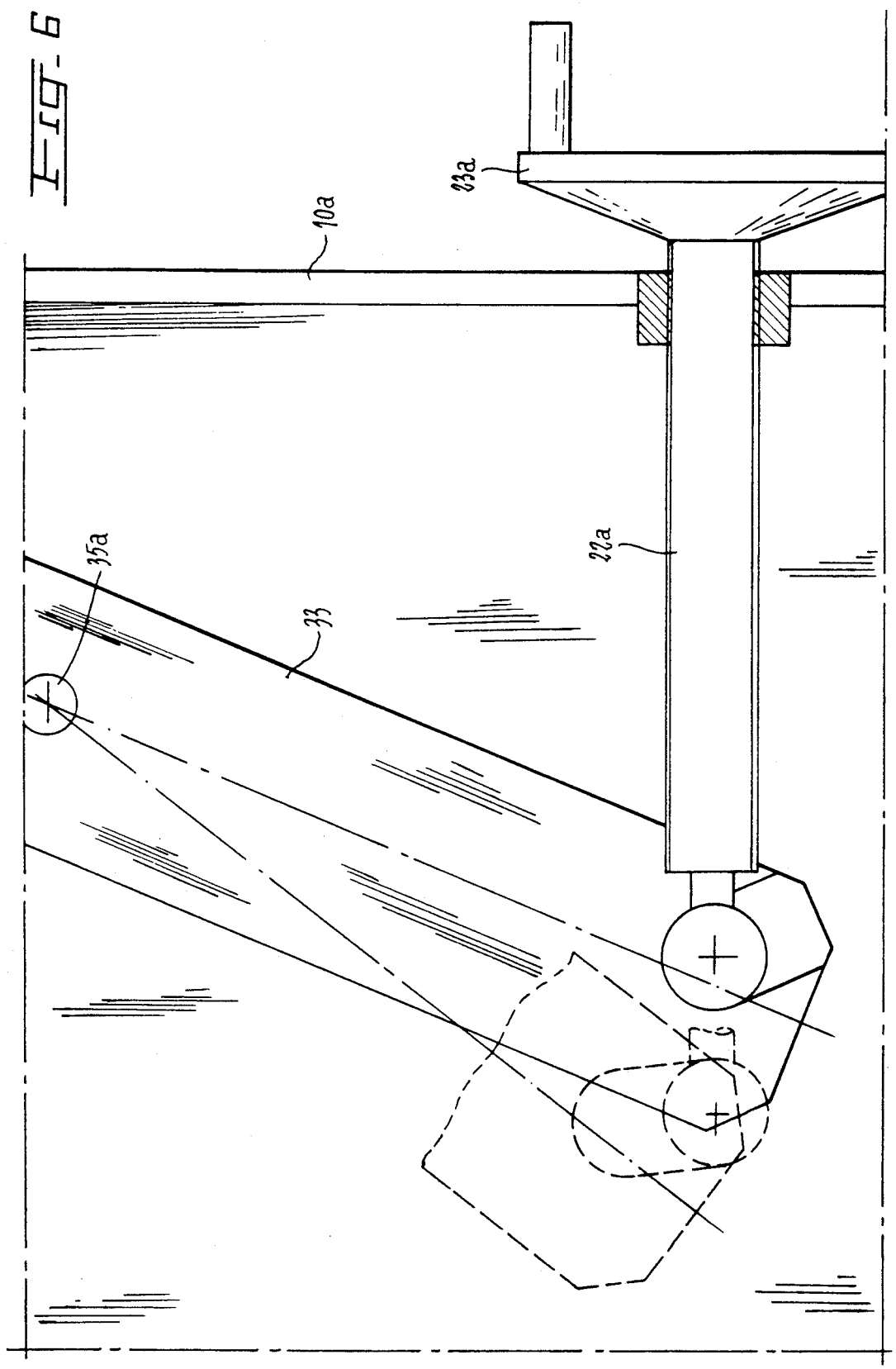

APPARATUS FOR GROUPING TOGETHER ARTICLES SIDE-BY-SIDE TRANSVERSELY AND LONGITUDINALLY IN GROUPS OF VARIABLE QUANTITIES FOR CONTINUOUS FEEDING TO PACKAGING MACHINES

FIELD OF THE INVENTION

My present invention relates to an apparatus intended to group together articles side-by-side transversely and longitudinally in groups of variable quantity for continuous feeding to packaging machines.

BACKGROUND OF THE INVENTION

A system for grouping articles side-by-side transversely and longitudinally in groups in variable quantities for continuous feeding to packaging machines is already known.

Thus for example patent GB 1,292,738 entitled "Variable finger means for controlling articles on conveyors" discloses the packaging of articles and more specifically, equipment appropriate for the packaging of a wide range of articles of different shapes and dimensions. This apparatus comprises a multiple line conveyor including a plurality of endless springs mounted between spaced rollers and having spaces between them, a pair of shafts mounted beneath the conveyor, the shafts being oriented parallel to the conveyor springs, a dolly slidably mounted on each of the rods, shaft means mounted on the two dollies and oriented transversely to the conveyor springs, a plurality of fingers mounted on the shaft means at positions spaced apart by the spaces between the conveyor springs, means for oscillating the shaft between a first position in which the fingers are in a position to block articles which are about to be moved forward by the conveyor and a second inactive position, and means to move the said dollies longitudinally along the said rods.

Patent GB 1,355,572 entitled "Improvements to the grouping of containers" discloses a method of and an apparatus for automatically continuously grouping a supply of similar vertical containers having parts with a cylindrical body which can therefore be packed with material in flexible foil along a conveyor. This apparatus provides for a mechanism to group the containers which comprises an extended conveyor with means for continuously feeding similar containers along it, the containers having cylindrical parts which are located on the conveyor with their cylinder axes in a vertical position. This conveyor includes in a first zone, first feed means located to feed containers in the first zone according to an arrangement in which the centrally aligned containers are longitudinally offset with respect to the adjacent transversely aligned outer containers, diverging lateral guides constraining the containers defining a second zone and diverging from a narrow end to the downstream end of the first zone at an end which is at least three times larger than the effective diameter of the containers, second feed means in the second working zone to produce a relative movement between the centrally aligned containers and the outer containers from which the central containers diverge when transversely aligned in a group with the corresponding outer containers and third operating feed means to advance the grouped containers in unison unison. The third feed means comprises closed circuit synchronized upper and lower feed means with thrust members adjacent respectively to the track of the adjacent upper parts and bottoms of the containers released from the second zone. The third means of supply also includes container location members positioned to keep the corresponding containers pointing upwards by engaging upper and lower parts thereof.

OBJECT OF THE INVENTION

The object of this invention is to provide means for regrouping articles fed in a transverse and longitudinal side-by-side arrangement in groups of variable quantity fed with a continuous movement to packaging machines which is structured in a particularly simple way in accordance with a new and original technical system having particularly useful technological content particularly for the specific sector of packaging machines for the packaging of groups of individual products or articles of large scale consumption such as bottles, cans and the like containers, for example, for containing beverages and other foodstuffs.

SUMMARY OF THE INVENTION

This object is achieved according to the invention with an apparatus for grouping together articles in transverse and longitudinal side-by-side arrangements in groups of variable quantity which are to be fed with a continuous movement to packaging machines. This apparatus comprises within a box-like enclosure a pair of link means to corresponding cursor-guide members in a mirror image arrangement and means for positioning at least one of the cursor-guide members in a rotational manner about means having a motor shaft with a common axis and corresponding guide members which can be rotated around corresponding motorized shaft means having axes which are coaxial with each other ending in counterthrusting and thrusting means respectively of the continuous feed transporter for objects to be packed by the packaging machine.

BRIEF DESCRIPTION OF THE DRAWING

These and other features and advantages deriving from the apparatus according to this invention for grouping articles in a transverse and longitudinal side-by-side arrangement in groups of variable quantity to be fed with continuous motion to packaging machines will become more readily apparent from the following detailed description of two preferred embodiments described here purely by way of example with reference to the appended drawing in which:

FIG. 2 shows diagrammatically in perspective view and on an enlarged scale the means in question with parts removed and others cross-sectioned to better reveal others in accordance with a first embodiment;

FIG. 2 is a functional diagram of the apparatus illustrated in FIG. 2;

FIG. 3 is a diagrammatic perspective view to an enlarged scale of an apparatus similar to that in FIG. 2 but according to a second embodiment, FIG. 3a is a functional diagram of the apparatus illustrated in FIG. 3, FIGS. 4 and 5 show on an enlarged scale kinematically interconnected members of the apparatus illustrated in FIG. 3 in two different functional positions; and FIG. 6 shows on an even more enlarged scale a further member relating to the kinematic members illustrated in FIGS. 4 and 5.

SPECIFIC DESCRIPTION

Figure 1:
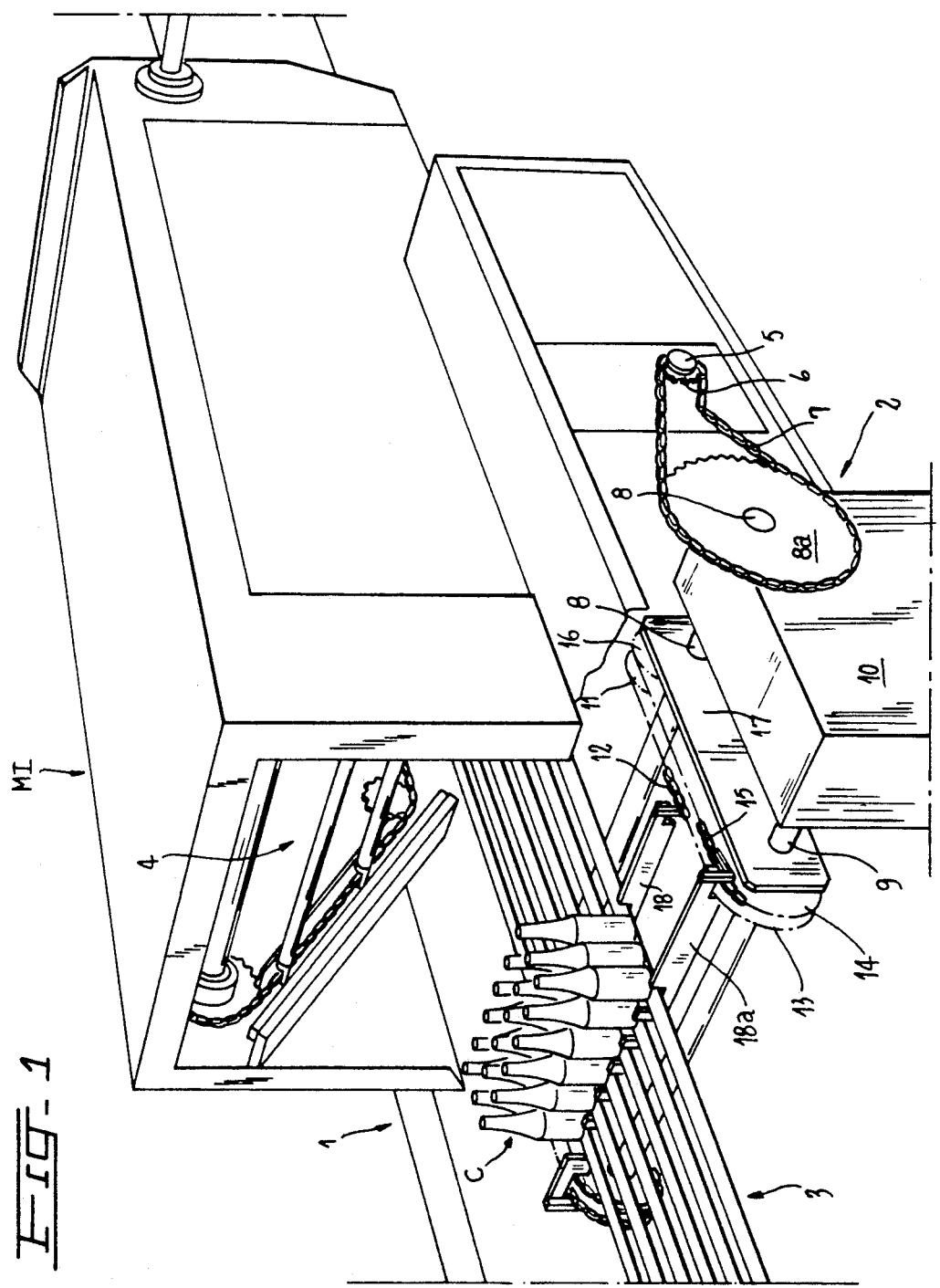
FIG. 1 shows diagrammatically in perspective view part of a packaging machine in which the apparatus according to this invention may be applied.

With reference to FIG. 1, which, as described above, shows a part 1 of a packaging machine MI, to the side of which the apparatus 2 according to this invention is fitted, there will be seen a conveyor 3 driven in continuous structured motion with multiple parallel plates transversely spaced apart for the transport of articles aligned in contact with each other in longitudinal and transverse ranks which are to be grouped into groups of varying quantities upstream of the zone indicated by 4 for corresponding subsequent packaging in a manner which is in itself known.

The apparatus 2 of this invention, are driven, as will be better seen below, by drive shaft 5 of packaging machine MI by means of a chainwheel 6 around which turns the drive chain 7 of a first motorized shaft 8 of the apparatus which is in turn driven by a second shaft 9 of the apparatus in a manner which will be seen below from the mechanism within a box 10 containing the said mechanism. On a first driven shaft 8 there is keyed a chainwheel 11 around which turns a chain 12 which also turns around a chainwheel 13 idly mounted on the aforesaid second shaft 9 onto which a chainwheel 14 is also keyed and around which turns a chain 15 which also turns around a chainwheel 16 idly mounted on the aforesaid first driven shaft 8. A second assembly equivalent to the first borne on a supporting plate 17 through which pass rotatably shafts 8 and 9 comprising keyed sprockets 11 and idle chainwheels 13 and keyed sprockets 14 and idle sprockets 16 of corresponding chains 12 and 15, is mounted on the said shafts 8 and 9 in a mirror image arrangement with respect to the first aforesaid on the opposite side of conveyor 3. Chains 12 and correspondingly chains 15 support by known support means a corresponding set of counterthrust members 18 and thrust members 18a respectively of the e.g. conventional type, the so-called comb type, designed to operate between the spaces existing between the belts forming conveyor 3. The aforesaid mechanism enclosed within box 10 of the apparatus according to this invention is shown in a first embodiment in FIG. 2 and substantially comprises two links G and G1 whose corresponding cursor member Ga-G1a is keyed in a mirror image fashion offset by 180° on a common shaft 19 which is rotatably supported by a supporting member 20 which is slidably and positionably mounted along a pair of vertical uprights 21 at which a threaded shaft 22 ends in a rotatable but non-slidable manner after screwably projecting from the upper wall of box 10 and on whose outer end with respect to said box 10 is mounted a control wheel 23. Chain wheel 8a, around which runs chain 17 which also runs around drive shaft 5 of the packaging machine, is keyed onto said shaft 19 between cursor member G1a of link G1 and slidably positionable supporting member 20. Parenthetically it should be noted that the aforesaid chainwheel 8a is shown in FIG. 1 outside box 10 solely to facilitate this description. Guide members 24, 24a of links G, G1 are keyed onto a corresponding shaft 25, 25a rotatably supported by box 10 in such a way as to project from the said box in an arrangement coaxial with shaft 19. On the outer end of said shafts 25, 25a with respect to box 10 there is keyed a corresponding chainwheel 26, 26a around which there turns a corresponding chain 27, 27a which also turns around a corresponding chainwheel 28, 28a keyed to aforesaid shafts 8 and 9 respectively.

From what has been described above it is clear that depending on the position which supporting member 20 is caused to adopt, and consequently shaft 19 on which cursor members Ga and G1a of links G and G1 are keyed in a mirror image fashion, by means of control wheel 23 and corresponding threaded shaft 22 the combination of cursor members Ga, G1a, guide members 24, 24a of said links G, G1 varies the speed of rotation of shafts 25 and 25a and consequently shafts 8 and 9 and therefore the working time for counterthrust members 18 and thrust member 18a on containers C which are continuously advanced on conveyor 3 causing variable quantities of containers C to be grouped into groups in accordance with the functional diagram illustrated in FIG. 2A.

From FIGS. 3, 3A, 4 and 5, which, as said above, illustrate a second embodiment of the means according to this invention, it will be seen that guide members 29, 29a of links Ga, G1a are coplanar and that cursor members 30, 30a are mounted in a diametrically opposing arrangement on a disc 31 keyed to a shaft 32 rotatably supported by a U-shaped supporting member 33 whose axis makes the position of said guide members 29, 29a lie in mirror image arrangement. A toothed wheel 34 is keyed between the walls following the U of U-shaped supporting member 33 onto shaft 32 and therewith engages a toothed wheel 35 which idles on a shaft 35a which is fixed to box 10a whereby toothed wheel 35 engages a toothed pinion 36 keyed onto a shaft 37 rotatably supported by said box 10a in such a way as to project outside the said box where a chainwheel 38 is keyed, around which there turns a chain 39 which also turns around drive shaft 5 of the packaging machine. Guide member 29 is made integral with a shaft 32a which is coaxial with aforesaid shaft 32 while guide member 29a is integral with a tubular shaft 40 which is coaxially mounted above shaft 32a. The said two coaxial shafts, 32a and 40, project supported by box 10a and onto each of these there is keyed externally to the said box 10a a chainwheel indicated by 41 and 42 respectively. A transmission chain 43 turns around chainwheel 41 and around a chainwheel 44 keyed to shaft 8a onto which counterthrust members 18 end, while a transmission chain 45 turns about chainwheel 42 and also around a chainwheel 46 keyed to shaft 9a in which the thrust members 18a illustrated in FIG. 1 end. A threaded shaft 22a which screwably projects from the posterior wall of box 10a and on whose end outside said box 10a is mounted a control wheel 23a ends in a rotatable and slidably guided manner (see FIG. 6) at said U-shaped supporting member 33.

Figure 5:
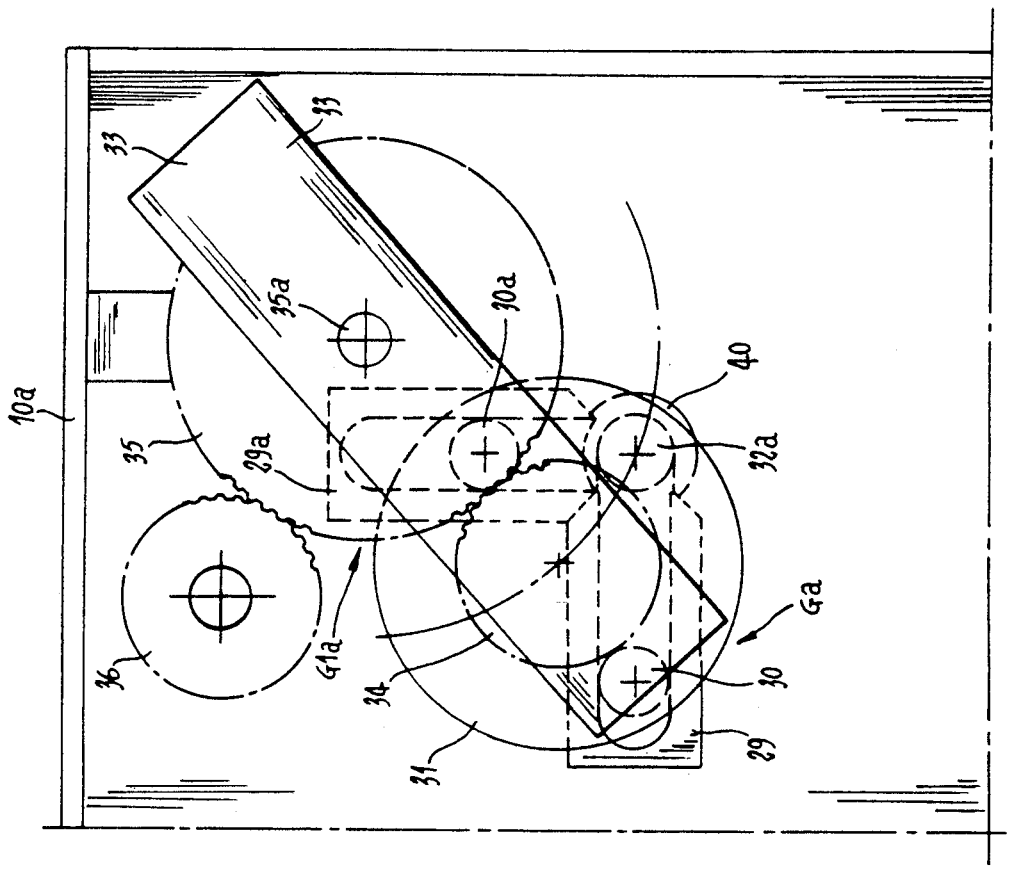
Figure 4:
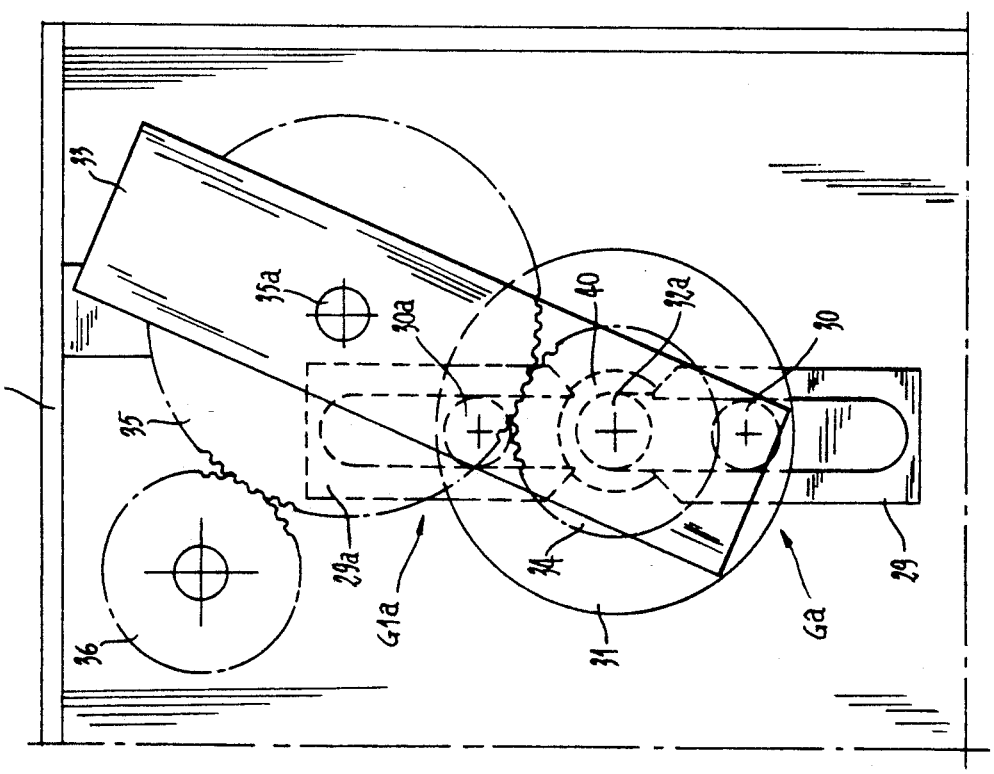

By operating the control wheel 23a so as to thrust against U-shaped support 33 it is possible to rotate toothed wheel 34 onto toothed wheel 35, see FIG. 5, causing guide member 29 to adopt an angular position which differs from the initial position by 180° positioning counterthrust members 18 against thrust members 18a so as to reduce the number of transverse files of products in the container groupings being formed (see FIG. 3A).

The description of the two preferred embodiments of the means in question with reference to the figures in the appended drawing is obviously purely given by way of example and it is therefore obvious that all modifications and variants suggested by practice and by its operation and use or employment may be applied thereto, and in any event within the scope of the following claims.

I claim:

1. An apparatus for grouping together articles in transverse and longitudinal side-by-side arrangements in groups of variable quantities to be fed in a continuous movement to a packaging machine, said apparatus comprising within a box-like enclosure a pair of link means to corresponding cursor-guide members in a mirror image arrangement and means to rotatably position at least one of the said cursor-guide members around drive shaft means having a common axis and with the corresponding guide members rotatable about the corresponding driven shaft means having axes coaxial between them which end in counterthrust and thrust means respectively of the conveyor providing a continuous feed of the objects which are to be packed by the packaging machine.

2. The apparatus defined in claim 1 wherein the said drive shaft means having a common axis to position at least one of the said cursor-guide members in a rotatable manner are coaxial with the said drive shaft means having axes which are coaxial to each other and end in counterthrust and thrust means respectively of the said conveyor feeding objects to be packed to the packaging machine.

3. The apparatus defined in claim 2 wherein the said drive shaft means having a common axis for rotatably positioning the said at least one of the said cursor-guide members are supported by supporting plate means supported by the box shell in a rotatable manner about an axis parallel to the said drive shaft means having a common axis and that threaded rod means with a control wheel are provided and end loosely at the said supporting plate means for positioning the said at least one of the said cursor-guide members in the desired position.

4. The apparatus defined in claim 1 wherein the said pair of link means to corresponding cursor-guide members in a mirror image arrangement are placed axially some distance apart in a mirror image arrangement, that the said common drive shaft means are supported by slidable support means and that threaded rod means with a control wheel are provided and end in the said slidable support means for positioning the said common drive shaft means with respect to the said drive shaft means having axes which are coaxial with each other ending in the counterthrust and thrust means respectively of the conveyor providing a continuous feed of objects to be packed by the packaging machine.

* * * * *